US005599152A

United States Patent [19]

Lingen

[11] Patent Number: 5,599,152

[45] Date of Patent: Feb. 4, 1997

[54] MULTICOMPONENT ATTACHMENT APPARATUS FOR A MOVEABLE WORKING DEVICE

[76] Inventor: Paul Lingen, Grefratherstr. 42, Wachtendonk, Wankum, Germany

[21] Appl. No.: 166,877

[22] Filed: Dec. 15, 1993

[30] Foreign Application Priority Data

Dec. 17, 1992 [DE] Germany .......................... 42 42 667.7

[51] Int. Cl.[6] .......................... B25J 5/00

[52] U.S. Cl. .......................... 414/10; 414/728; 414/742; 414/744.3; 414/744.4

[58] Field of Search .......................... 414/728, 10, 735, 414/738, 742, 744.3, 744.4, 744.5

[56] References Cited

U.S. PATENT DOCUMENTS

| | | | |
|---|---|---|---|
| 3,262,593 | 7/1966 | Hainer | 414/735 X |
| 3,598,263 | 8/1971 | Ehmke . | |
| 4,352,620 | 10/1982 | Inaba et al. | 414/738 X |
| 4,428,710 | 1/1984 | Grisebach et al. | 414/735 X |
| 4,588,346 | 5/1986 | Smith | 414/744.5 X |

FOREIGN PATENT DOCUMENTS

| | | | |
|---|---|---|---|
| 0311869 | 4/1989 | European Pat. Off. . | |
| 0393004 | 10/1990 | European Pat. Off. | 414/735 |
| 2515562 | 10/1976 | Germany . | |
| 7635851 | 3/1977 | Germany . | |
| 813516 U | 4/1989 | Germany . | |
| 9107033.3 | 9/1991 | Germany . | |
| 9200663 | 4/1992 | Germany . | |

*Primary Examiner*—Karen B. Merritt
*Assistant Examiner*—Janice L. Krizek
*Attorney, Agent, or Firm*—Watson Cole Stevens Davis, P.L.L.C.

[57] ABSTRACT

A multicomponent attachment apparatus for a movable working device which is detachably attached to the front end of the working device, including a device-sided adapter in order to connect the attachment to the working device, a building component-sided supporting member with holders to pick up, move, hold and deliver a building component, and intermediate pieces between the adapter and the supporting member, whereby the intermediate pieces are connected movably together and to the adapter and the supporting member and include a lifting module (1) which is connected to the working device and can be vertically adjusted and fixed in position at any desired height with respect to the working device by a lifting drive; a sliding module (4) movably mounted to opposite sides of the front of the lifting module (1) and movable by a sliding drive and stoppable in any desired side position; a spacing module (10) mounted to the front of the sliding module is movable in a longitudinal direction of the working device by means of a spacing drive and can be held in a desired position; and a swivelling module (20, 26) which is swivel-mounted on the front of the spacing module (10) and is swivellable by a pivot drive and can be stopped in a desired swivel position.

3 Claims, 2 Drawing Sheets

MULTICOMPONENT ATTACHMENT APPARATUS FOR A MOVEABLE WORKING DEVICE

BACKGROUND OF THE INVENTION

The invention relates to a multicomponent attachment apparatus for a moveable working device, which apparatus is detachably attached to the front end of the working device, with a device-sided adapter in order to connect the attachment apparatus to the working device, with a building component-sided supporting member with holders to pick up, move, hold and deliver a building component with intermediate pieces between the adapter and the supporting member, whereby the intermediate pieces are movably connected together and to the adapter and the supporting member.

Several persons have to simultaneously assemble board-shaped and/or rod-shaped building components if the building components are heavy or their spatial dimensions are large, whereby the building components, for example large area boards or long rods, beams or frames and the like, must be moved into the requisite position, held there and attached. Such work is difficult and exhausting as a consequence of the large dimensions and excessive weight of such building components. In addition, the persons involved in this work run a high risk of accidents and the risk that such boards or rods could be damaged during the assembly work.

An attachment for a moveable fork lift truck is known from German utility model 92 00 66, where the attachment has a frame, which is to be connected to the forks of the fork lift truck. In addition, the attachment has a pickup device to pick up and deliver objects to be transported, whereby the pickup device is connected to the frame so as to swivel around a horizontal axis. In so doing, the pickup device exhibits grasping elements to hold board-shaped mounting elements. In addition, it is provided that the horizontal axis is aligned transversely to the direction of travel of the fork lift truck and that the pickup device can also be swivelled around a vertical axis. The horizontal axis and the vertical axis can be held in a first adapter of the pickup device that is connected to the rest of the pickup device so as to swivel around the horizontal axis and is connected to the frame so as to swivel around the vertical axis. Thus, the attachment of mounting plates during the construction of cooling rooms and chambers is simplified.

With this attachment one can only pick up boards and rotate around three axes. With the attachment such boards cannot be accurately positioned. Rather, to position the boards accurately it is necessary to position the boards with the fork lift truck carrying the attachment, thus to drive accurately with the fork lift truck. To this end, an especially experienced fork lift truck driver is required who must be constantly present at such assembly jobs. It is not enough to drive the fork lift truck merely approximately in the vicinity of the assembly site and to position accurately with the attachment.

An attachment for fork lift trucks with a lifting scaffold for vertical adjustment, which can function without any additional bracing measures, is known from German Offenlegungsschrift 25 15 562. This system is designed such that the fork carrier of the fork lift truck has a telescopable boom whose angle can be adjusted and whose platform is held in the horizontal position with a hydraulic tilt correcting device, which is automatically controlled by the respective angle adjusting device of the boom. At the same time, elements are provided that couple the mechanical, hydraulic and electric drive systems of the attachment with the corresponding energysources of the fork lift truck that delivers the mechanical, hydraulic or electric energy.

In German utility model 76 35 851 a device for picking up a body, in particular a board, is described, wherein a frame that can be affixed to a conveying vehicle is provided that is designed for mounting a drive motor, a pneumatic pump and a hydraulic unit, and wherein a suction plate, which can be swivelled by means of a working cylinder, is hinged by means of a joint to the frame.

A fork lift truck comprising fork tines, which can be moved transversely by means of a drive in guides of the fork carrier, and comprising auxiliary equipment for coupling containers or the like, for example, to pick up containers for storage of harmful substances and liquids, is known from German Utility Model 88 13 516. This system is designed such that there are lever-shaped supports which can be swivelled around the base region of the fork tines; which can be lowered by means of a drive from their inactive position, folded against the lifting scaffold of the fork lift truck, onto the fork tines; which can be coupled shape-locking with the fork tines; and whose internal sides or regions facing each other exhibit shaped pieces and/or cones or the like in order to couple shape-lockingly to the containers.

According to an attachment device which is known from German Utility Model 91 07 033 and intended for an attachment which can be built on a fork lift truck, a device pickup plate with a tine pickup device on its bottom edge and clamping jaws arranged one above the other at intervals is provided above the tine pickup device, of which at least one clamping jaw can be vertically adjusted. The vertically adjustable clamping jaw penetrates an opening of the device pickup plate and can be rotated on the one eccentric disk, whereby the clear diameter of the opening is greater than the diameter of the bolt.

A manipulator for handling heavy loads, in particular printing products, which can be wound on spools and loosely stacked in scale formation, is known from EP 0 311 869 A1, whereby a holder is held on a free end of an axis of rotation, tilted by a positional angle relative to the vertical line, or a free end of a rigid supporting arm, which is tilted by an angle and is attached to a mounting device, whereby the holder can be rotated or swivelled relative to the mounting device. At the same time, the positional angle lies between the axis of rotation or the supporting arm and a horizontal plane between 30° and 60°.

SUMMARY OF THE INVENTION

The invention is based on the object of providing an attachment of the aforementioned kind with which it is possible to position accurately building components in the form of bulky-boards and long beams or frames without having to perform this accurate positioning with the working device itself.

This problem is solved according to the invention in that a lifting module, which is to be connected to the working device and can be vertically adjusted and fixed in position at any desired height with respect to the working device by means of a lifting drive, is attached to the device-sided end of the attachment; that a sliding module is attached to opposite sides of the front of the lifting module and can be horizontally moved by means of a sliding drive and stopped in any desired side position; that the front of the sliding module has a spacing module and is elongated or shortened in the longitudinal direction by means of a spacing drive and is held in the desired position; and that a swiveling module is swivel-mounted on the front of the spacing module and is swivelled by means of a pivot drive and is stopped in a desired swivel position.

Thus, an attachment is obtained with which building components can be moved three dimensionally, linearly and radially in three planes.

The attachment can be designed expediently in such a manner that a tilting module, which is tilted by means of a tilting drive in both directions of tilt around an axis of tilt oriented at right angles to the longitudinal direction in a plane parallel to ground level, is provided between the sliding module and the spacing module.

A rotary module, which is rotated by means of a rotary drive in both directions of rotation around an axis of rotation that stands perpendicularly to the ground level and extends through the center longitudinal axis of the spacing module, can be provided between the spacing module and the swiveling module.

Furthermore, it is recommended that the swivelling module comprise a swivel arm and a supporting arm, whereby the bottom end of the swivel arm is pivot-mounted in a swivelling bearing on the spacing module or the rotary module and the upper end of the swivel arm is connected swivellably by way of an upper swivelling bearing to the supporting arm.

The drives of the individual modules can be mechanical, electrical, hydraulic or pneumatic drives or manual drives.

According to another expedient feature of the invention, the system can be designed in such a manner that suction cups, electromagnets or mechanical holders in the form of clamps or the like, which are distributed in a specific pattern on the supporting armor are arranged on a specific grid, are provided as holders on the supporting arm.

In the following the invention is explained in detail with the aid of the accompanying drawings and the following discussion.

DETAILED DESCRIPTION OF THE PREFERRED EMBODIMENT

Figures 1, 2:
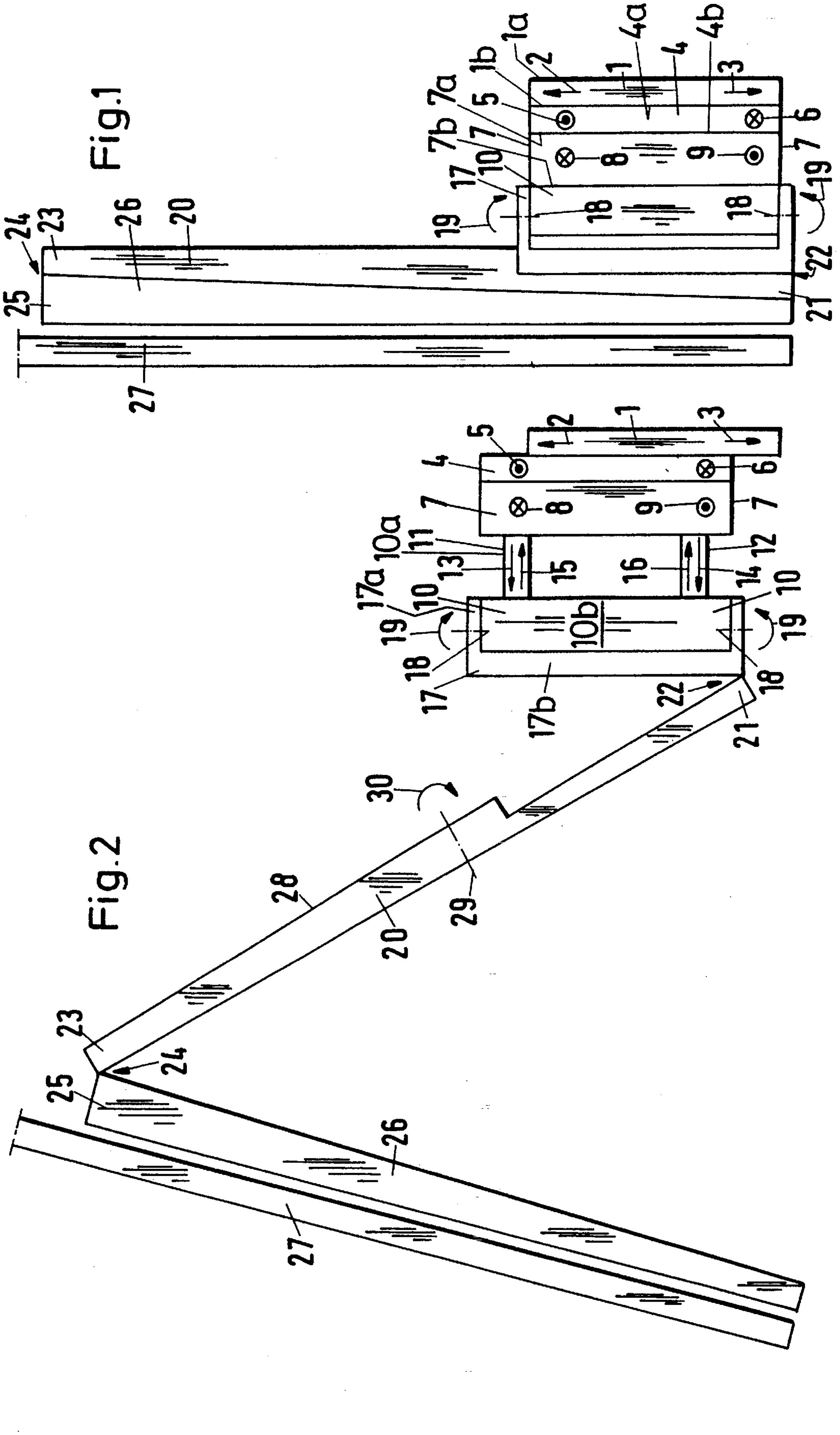
FIG. 1 is a schematic side view of a preferred embodiment of an attachment (manipulator) apparatus according to the present invention, in an inactive position.
FIG. 2 schematically depicts the attachment apparatus of FIG. 1 in an active position.
Figure 3:
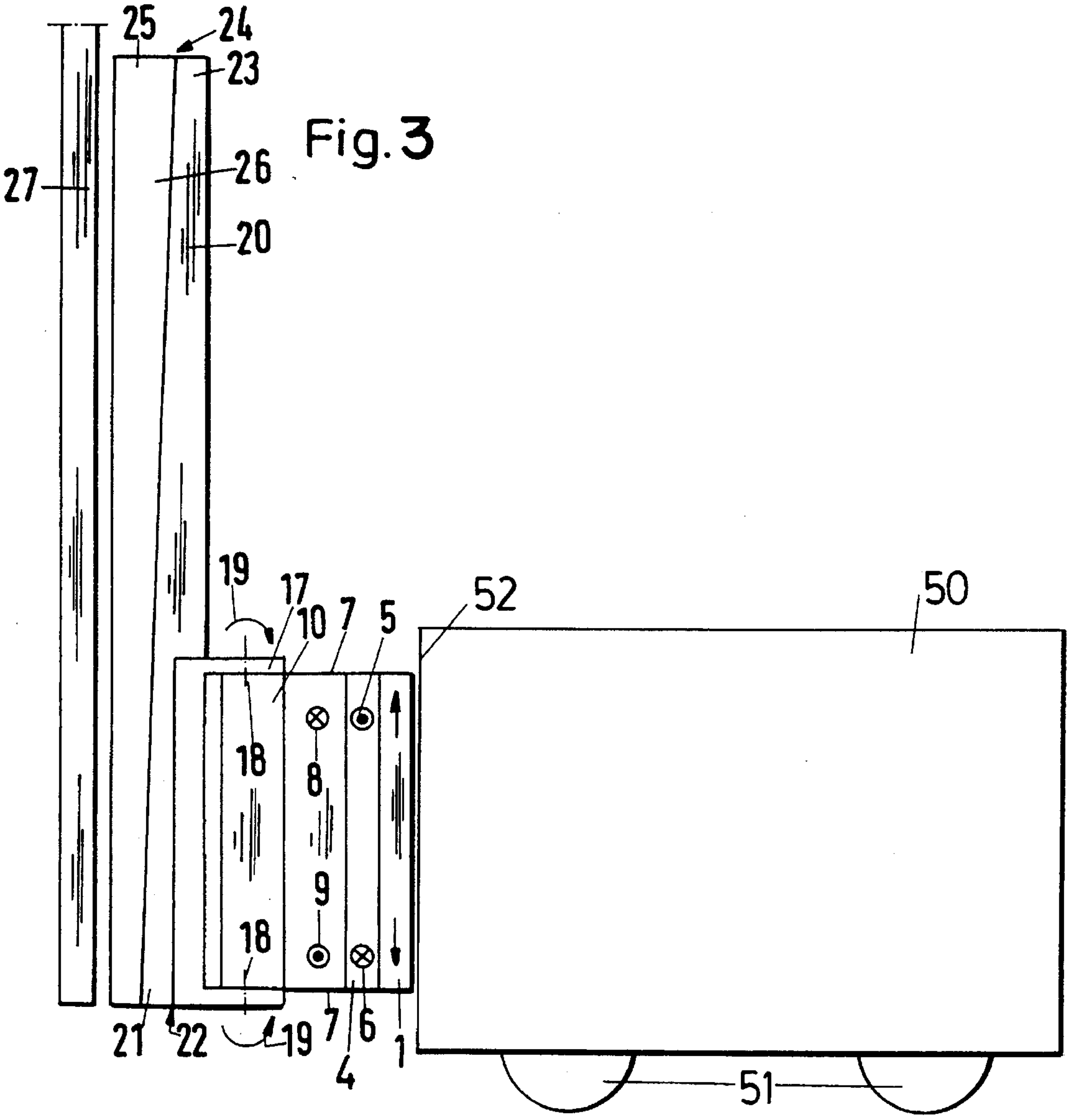
FIG. 3 shows the attachment (manipulator) apparatus of FIG. 1 attached to an end of a schematically depicted ground conveying vehicle.

A lifting module 1, which is adjustable upwardly in the direction of the arrow 2 on a ground conveying vehicle 50 (see FIG. 3) with movement means 51 and downwardly in the direction of the arrow 3 and can be stopped at any desired height, is provided in a longitudinal direction of the vehicle on the front end 52 thereof. The lifting module has a rear end 1*a* facing the vehicle and a front end 1*b*.

A sliding module 4, which can be moved to the left along the lifting module 1 in the direction of arrow 5 and to the right along the lifting module 1 in the direction of arrow 6 and can be fixed in any desired position, is provided on the front of the lifting module 1 in the longitudinal direction of the vehicle. The drive for the sliding module 4 is not shown in detail. The rear end 4*a* of sliding module faces the front end 1*b* of the lifting module.

Furthermore, a tilting module 7, which can be tilted upwardly to the right relative to the sliding module 4 in the direction of arrow 8 or downwardly to the left in the direction of arrow 9, and vice versa, by means a drive (not shown in detail), is arranged in front of the sliding module 4 in the longitudinal direction of the vehicle. The rear end 7*a* of the tilting module faces the front end 4*b* of the sliding module.

Instead, the possibility of tilting the upper segment 28 of the swivel arm 20 around an axis 29 in the direction of arrow 30 and in the opposite direction of arrow 30 also exists.

Moreover, a spacing module 10, which is connected to the tilting module 7 by spacing holders 11 and 12, is attached in front of the tilting module 7 in the longitudinal direction of the vehicle, whereby the spacing module 10 can be adjusted in front of the longitudinal direction of the vehicle in the direction of arrows 13 and 14 and in the rear in the direction of arrows 15 and 16 counter to the longitudinal direction of the vehicle by means of a spacing drive (not shown). The spacing holders constitute a rear end portion 10*a* of the spacing module which is attached to the front end 7*b* of the tilting module.

A rear end 17*a* of a rotary module 17 can be rotated to the right around an axis of rotation 18 in the direction of arrow 19 and to the left in the opposite direction of arrow 19 about a front portion 10*b* of the spacing module 10. The rotary module drive is not depicted.

The bottom end of the rotary module 17 has a swivel arm 20, whose bottom end 21 in the region 22 is pivot-mounted by means of a swivel joint to the rotary module 17 and whose upper end 23 in the region 24 is connected by means of a rotary joint to the upper segment 25 of a support arm 26. The support arm has (in a manner that is not shown in detail) holders in the form of suction cups, electromagnets, mechanical clamps or the like, with which a building component 27 is to be picked up, moved, held and delivered again. The building component 27 can be a board-shaped building component or a rod-shaped building component, and in particular made of metal, plastic, wood, concrete or the like.

Unwieldy pallets, boards and similar board-shaped objects such as windows, doors and the like, but also rod-shaped materials, especially profiles, can be lifted, swung, moved forward and shifted sideways with the attachment described above. Thus, it is possible with the supporting arm 26 attached to the attachment to arbitrarily move a sheet or the like in place. Thus, the following six components of motion are possible:

a) lifting and lowering,
b) shifting sideways to the left and the right,
c) shifting longitudinally fore and aft,
d) tilting to the top right and left around a horizontal longitudinal axis,
e) rotating to the right and to the left around a vertical axis, and
f) pivoting around a horizontal lateral axis.

To pick up, move, hold and deliver a single building component it is possible to use either only suction cups, or only electromagnets or suction cups and electromagnets together. In addition, mechanical holders can be employed.

The individual modules are interchangeable in their arrangement relative to each other. For simpler applications individual modules can be dispensed with.

I claim:

1. The combination of an elongated vehicle that is movable over a ground surface and defines an end and a longitudinal axis that extends through said end, and a multicomponent manipulator apparatus attached to said vehicle for picking up, holding, moving and delivering building components, said manipulator apparatus comprising:

a lifting module attached to said end of the vehicle, said lifting module having a rear end facing the vehicle and a front end, and first drive means for moving the module up and down relative to said longitudinal axis, a sliding module attached to said lifting module, said sliding module having a rear end facing the front end of the lifting module and a front end, and second drive means for moving the sliding module transversely to said longitudinal axis, a tilting module attached to said sliding module, said tilting module having a rear end facing the front end of the sliding module and a front end, and third drive means for moving the tilting module about a tilt axis parallel to said longitudinal axis, a spacing module attached to said tilting module, said spacing module having rear portion attached to the front end of the tilting module and a front portion, and fourth drive means for moving the front portion toward and away from the tilting module along a spacing axis parallel to said longitudinal axis, a rotary module defining a rear portion attached to the front portion of said spacing module end a front portion and a fifth drive means for rotating the rotary module about a rotary axis perpendicular to said spacing axis, and a swivel module having a swivel arm and a support arm, said swivel arm having a first end attached to the front portion of the rotary module to pivot about a first swivel axis perpendicular to said rotary axis and a second end, said support arm having a first end attached to the second end of the swivel arm to pivot about a second swivel axis perpendicular to said rotary axis, said support arm mounting gripping means for gripping a building component, and sixth drive means for moving said swivel arm about said first swivel axis and said support arm about said second swivel axis.

2. The combination as claimed in claim 1, wherein said first, second, third and fourth drive means are selected from the group of electrical, hydraulic and pneumatic drives.

3. The combination as claimed in claim 1, wherein said gripping means on said support arm comprise suction cups, electromagnets or mechanical holders in the form of clamps distributed in a specific pattern on the support arm.

* * * * *